US006973726B2

(12) United States Patent
Kramer

(10) Patent No.: US 6,973,726 B2
(45) Date of Patent: Dec. 13, 2005

(54) MANUALLY OPERATED TOOL

(75) Inventor: Jochen Kramer, Waiblingen (DE)

(73) Assignee: Andreas Stihl AG & CO KG, (DE)

( * ) Notice: Subject to any disclaimer, the term of this patent is extended or adjusted under 35 U.S.C. 154(b) by 0 days.

(21) Appl. No.: 10/741,014

(22) Filed: Dec. 18, 2003

(65) Prior Publication Data

US 2004/0128837 A1 Jul. 8, 2004

(30) Foreign Application Priority Data

Dec. 21, 2002 (DE) ................................ 102 60 466

(51) Int. Cl.[7] ................................................ B26B 19/38
(52) U.S. Cl. .......................... 30/216; 30/383; 16/110.1
(58) Field of Search .......................... 30/210, 216, 276, 30/381, 382, 383, 384, 385, 520, 228, 392, 30/514; 16/110.1, 426, 422, 900

(56) References Cited

U.S. PATENT DOCUMENTS 4,974,325 A * 12/1990 Hartlein ....................... 30/383
6,108,867 A * 8/2000 Nagashima ................ 16/110.1
2004/0187322 A2* 9/2004 Bednar et al. ................ 30/392

FOREIGN PATENT DOCUMENTS

| | | | |
|---|---|---|---|
| DE | 28 16 485 | | * 10/1979 |
| DE | 29 09 777 | | * 9/1980 |
| DE | 40 21 277 | | 3/1991 |
| DE | 19532299 | C2 | 6/1997 |
| EP | 0 267 472 | | 5/1988 |
| EP | 1 334 789 | A2 | * 12/2002 |
| WO | WO97/04636 | | 2/1997 |

* cited by examiner

*Primary Examiner*—Hwei-Siu Payer
(74) *Attorney, Agent, or Firm*—Robert W Becker & Associates; Robert W Becker

(57) ABSTRACT

A manually operated implement is provided having a housing fixed on a frame and accommodating an internal combustion engine that is adapted to drive a tool. The implement has a front hand grip secured to the frame, and a rear handle secured to a side of the frame that is remote from the tool. The rear handle is mounted to the frame in such a way as to be rotatable about an axis of rotation. A mounting is provided that comprises a pin mounted in a receiver, the receiver being embodied such that it is adapted to be split.

9 Claims, 3 Drawing Sheets

MANUALLY OPERATED TOOL

BACKGROUND OF THE INVENTION

The invention relates to a manually operated tool such as a hedge clipper or similar device.

A manually operated tool having a handle which is mounted in a receiver such that it is able to rotate is known from DE 40 21 277 C2. The throttle control is positioned on the rear handle such that the throttle cable leads from the handle through the rotating receiver. When the throttle cable requires servicing it is necessary to dismantle the receiver and the rear handle until the throttle cable is accessible.

The object of the invention is to create a manually operated tool of the generic type which can be serviced with minimum effort.

SUMMARY OF THE INVENTION

This object is achieved by means of a manually operated tool having a housing that is fixed on a frame and accommodates an internal combustion engine that is adapted to drive a tool, and further having a front end grip secured to the frame and a rear handle that is secured to a side of the frame that is remote from the tool, with the rear handle being mounted to the frame so as to be able to be rotatable about an axis of rotation; a mounting is provided that comprises a pin mounted in a receiver, which is embodied such that it is adapted to be split.

The split design of the receiver allows the receiver to be opened without the tool housing having to be opened/dismantled fully and thus permits the simple assembly and disassembly of the rear handle. The rear handle is thus easily accessible for servicing.

Servicing no longer requires time-consuming dismantling work. In this arrangement, the mounting is positioned on a frame to which the housing is also fixed. This means that the mounting can be of simple design.

The receiver is usefully positioned on the frame and the pin on the rear handle. The pin positioned on the handle thus serves as a guide for the throttle cable. Positioning the pin on the rear handle results in a simple and compact design. The receiver is usefully split in a plane which runs approximately horizontally when the tool is in the normal operating position. The axis of rotation of the rear handle advantageously runs approximately parallel to the length of the tool. This means that whatever the position of the handle the relationship to the tool is such that the operator is able to carry out even cuts with the tool whatever the position of the handle. In order to avoid a rotational load on the wrist of the hand of the operator positioned on the rear handle, the axis of rotation of the rear handle passes through the centre of gravity of the tool.

The receiver is advantageously formed by two shells which are positioned on front faces of adjacent components. To open the receiver it is simply necessary to separate the two components from one another. As a result, the receiver can be split simply. One shell is usefully formed by the fuel tank of the tool. This means that no additional components are required for the receiver, the receiver being integrated in existing components. By positioning the tank on the frame it is possible to reduce tool vibration during operation.

The shells are connected together with screws in such a manner that they can be separated. This ensures easy separation of the shells. In order to simplify assembly, the shells are connected together in a positive fit in a plane approximately perpendicular to the longitudinal axis of a screw. The two shells can thus first be fitted together, and then fixed together with one or more screws. An advantageous design is produced when the positive connection is formed by at least one screw boss which is fixed to one shell and projects into an opening in the other shell. The receiver can thus first be assembled using the screw boss(es) and only then need be screwed together.

BRIEF DESCRIPTION OF THE DRAWINGS

An embodiment is described below with reference to the drawing.

DESCRIPTION OF PREFERRED EMBODIMENTS

Figure 1:
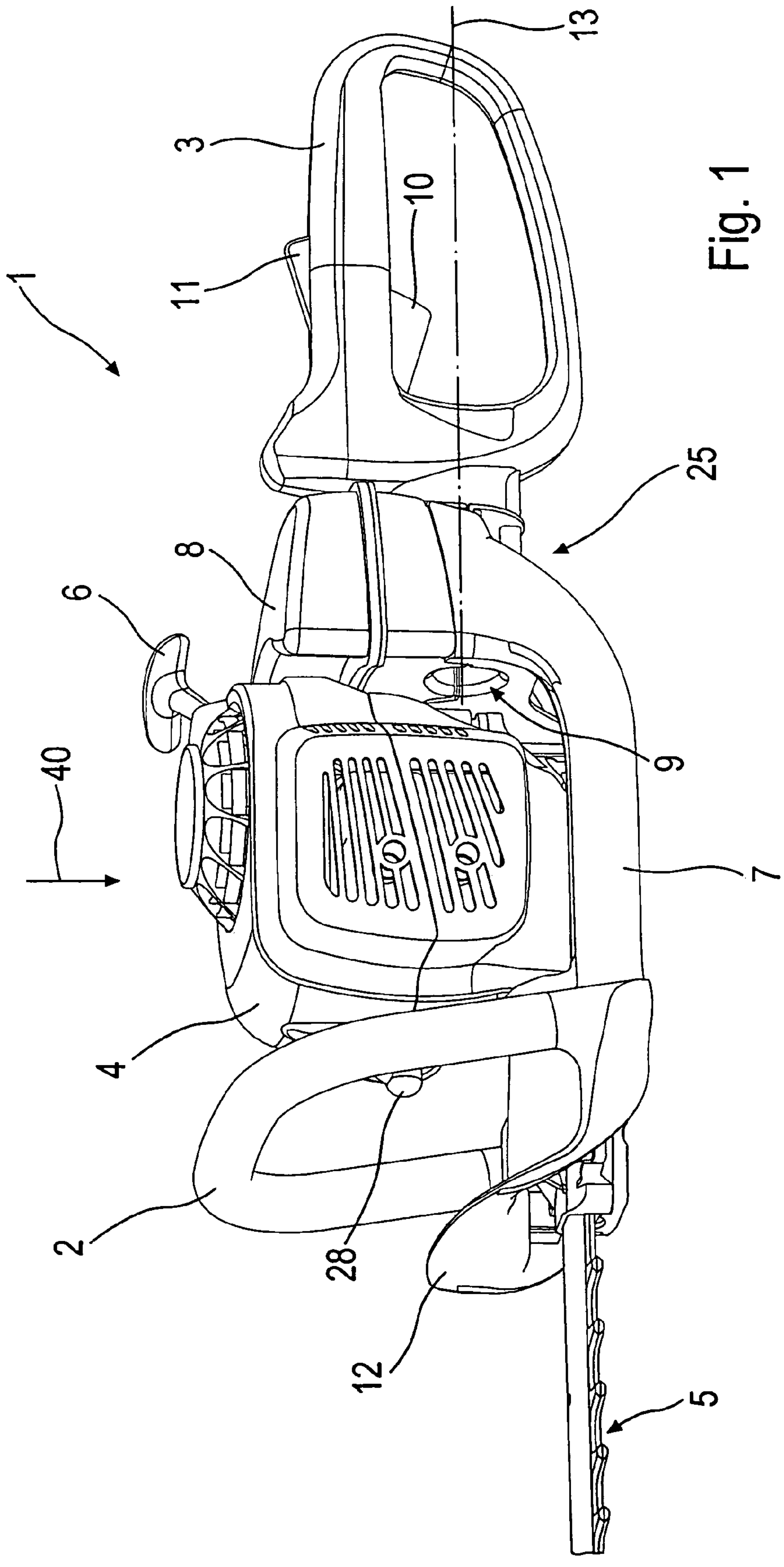
FIG. 1 shows a perspective view of a hedge clipper.

The hedge trimmer 1 illustrated in FIG. 1 has a frame 7 to which is fixed a housing 4. Positioned in the housing 4 is an internal combustion engine (not illustrated). The internal combustion engine drives a clipper blade 5 which projects from the housing 4 as an extension of the frame 7. A spark plug 28 projects out of the housing 4 on the side of the housing 4 facing the clipper blade 5. Also positioned on the housing 4 is a starter handle 6 for manually starting the internal combustion engine. Fixed to the frame 7 is a bow-shaped front hand grip 2. The front hand grip 2 is positioned in an area between the housing 4 and the clipper blade 5 and overlaps the extension of the clipper blade 5 in the direction of the housing 4. Fixed to the side of the frame 7 facing the clipper blade 5 is a hand guard 12 which extends approximately between the front hand grip 2 and the clipper blade 5.

Positioned on the side of the frame 7 facing away from the clipper blade 5 is a rear handle 3. The rear handle 3 is designed as a closed frame and has a throttle control 10 and a cut-out control 11. The rear handle 3 is mounted in a mounting 25 in the frame 7 in such a manner that it is able to rotate about the axis of rotation 13. The mounting 25 is formed by a receiver 9 into which projects a pin (not illustrated) positioned on the rear handle 3. The receiver 9 is formed by the frame 7 on one side and by the fuel tank 8 on the side facing way from the frame 7. The receiver 9 is formed such that it can be split. In the normal working position of the hedge clipper 1 illustrated in FIG. 1, the plane of splitting runs approximately horizontally, i.e. approximately vertically in relation to the direction 40 of the pull of gravity.

Figure 2:
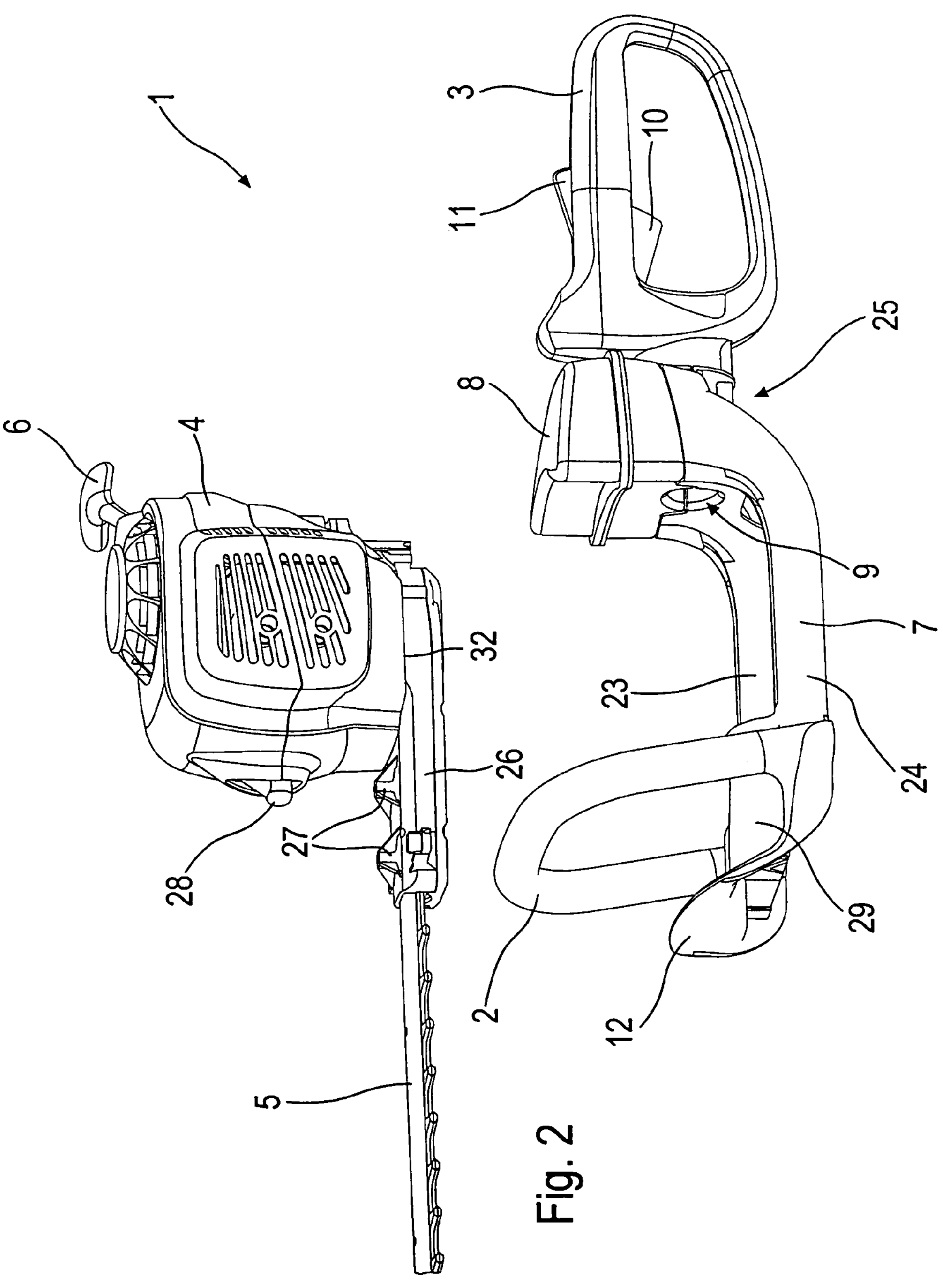
FIG. 2 shows a perspective view of the hedge clipper illustrated in FIG. 1 with the internal combustion engine removed.

FIG. 2 shows the frame 7 with rear handle 3 and the housing 4 with clipper blade 5 separately. Positioned on the side of the housing 4 facing the frame 7 is a receiver 26 for the clipper blade 5 which extends along the clipper blade 5 to the housing 4. In the area of the housing 4, the frame 7 is formed by rails 23 and 24 which extend along the clipper blade 5 on either side of the receiver 26. In the area of the front hand grip 2 the rails 23 and 24 are connected together by a connecting bridge 29. When the housing 4 is located in the frame 7, the side 32 of the housing 4 lies on the rails 23 and 24. The bridge 29 overlaps the receiver 26 of the clipper blade 5. The housing 4 is fixed to the connecting bridge 29 of the frame 7 via two screw bosses 27 disposed in the area of the receiver 26.

Figure 3:
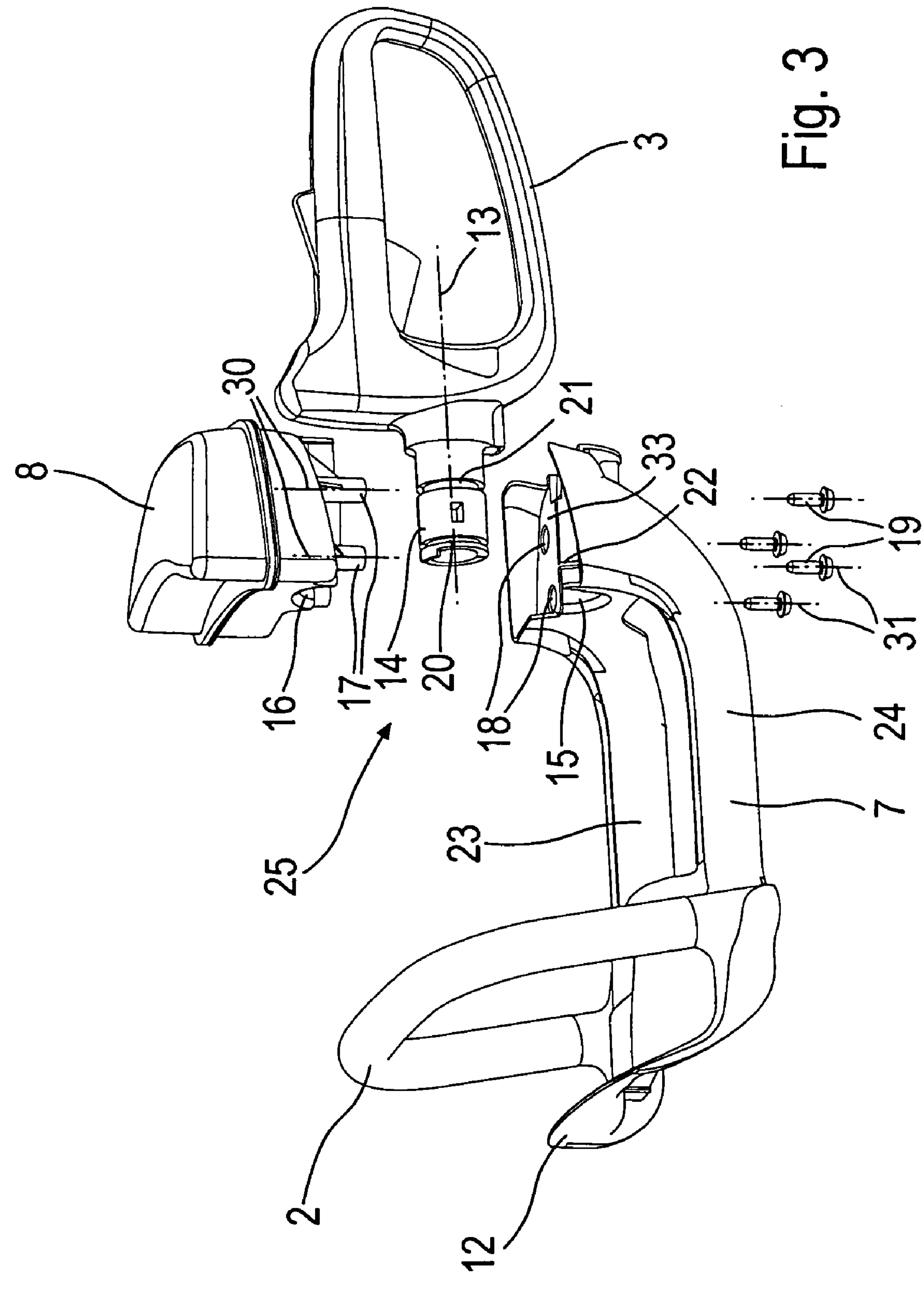
FIG. 3 shows the frame of the hedge clipper illustrated in FIG. 1 in exploded form.

FIG. 3 shows the frame 7 with rear handle 3 in an exploded view. The mounting 25 is made of two shells 15 and 16 in which is held a pin 14. The pin 14 is formed in one piece with the rear handle 3 and is hollow. Passing through the pin 14 is a throttle cable (not illustrated in FIG. 3). The pin 14 has two peripheral grooves 20 and 21 which secure the pin 14 axially in relation to the axis of rotation 13. The shell 15 is formed together with the frame 7 and extends centrally between the two rails 23 and 24 to the end of the frame 7 facing away from the front hand grip 2. Formed on the frame 7 on both sides of the shell 15 are covers 33 positioned in the plane of splitting of the two shells 15, 16 which themselves feature openings 18. The frame 7 extends beyond the plane of the covers 33 towards the tank 8.

The shell 16 is formed together with the tank 8. To the side of shell 16 a total of four screw bosses 17 are positioned symmetrically in relation to the axis of rotation 13. When the tank 8 is fitted onto the frame 7, the screw bosses 17 project into the openings 18 and thereby form a positive-locking connection between the two shells 15 and 16 in the plane formed by the covers 33. Perpendicular to said plane, i.e. in the direction of the longitudinal axes 30 of the screw bosses 17 and the longitudinal axes 31 of the screws, the tank 8 is fixed to the frame 7 by means of the screws 19. When the rear handle 3 is fitted, the pin 14 is first placed in shell 15 so that the bridge 22 of shell 15 projects into the groove 20 in the pin 14. The tank 8 is then placed on the top so that the screw bosses 17 project through the openings 18. The tank 8 is then fixed to the frame 17 by means of the screws 19. It may be useful for the two shells 15 and 16 be connected together in a positive fit in the plane formed by the covers 33, i.e. in the plane of splitting of the receiver, by other means, for example by means of raised and lowered areas which mesh with one another. In this arrangement, the rear handle 3 is positioned such that it lies parallel to the length of the clipper blade 5 and passes through the centre of gravity of the hedge clipper 1.

By forming the receiver 9 from already existing components it is possible to save an additional component. At the same time it is also possible to reduce the weight of the tool. To service the rear handle 3 it is simply necessary to loosen the screws 19 and split the receiver 9. The rear handle 3 can then be removed. The plane of splitting between the two shells 15 and 16 lies adjacent to one of the front faces of the frame 7 and one of the front faces of the tank 8 so that rather than having to split components, it is simply necessary to separate the components which form the shells 15 and 16 from one another.

I claim:

1. A manually operated implement, comprising:

a frame;

a housing fixed on said frame and accommodating an internal combustion engine that is adapted to drive a tool;

a front hand grip secured to said frame;

a rear handle secured to a side of said frame that is remote from the tool, wherein said rear handle is mounted on said frame in such a way as to be rotatable about an axis of rotation;

a mounting comprising a pin mounted in a receiver, wherein said receiver is a split receiver disposed on said frame, and wherein said pin is disposed on said rear handle, and wherein said receiver is formed by two half-shells that are disposed on end faces of adjacent components.

2. An implement according to claim 1, wherein said receiver is split in a plane that in a normal operating position of said implement extends approximately horizontally.

3. An implement according to claim 1, wherein said axis of rotation of said rear handle extends approximately parallel to a longitudinal extension of said tool.

4. An implement according to claim 1, wherein said axis of rotation of said rear handle extends through a center of gravity of said tool.

5. An implement according to claim 1, wherein one of said half-shells is formed by a fuel tank of said implement.

6. An implement according to claim 1, wherein one of said half shells is formed by said frame.

7. An implement according to claim 1, wherein said half-shells are detachably interconnected by means of screws.

8. An implement according to claim 7, wherein said half-shells are positively interconnected by a positive connection in a plane that extends approximately perpendicular to a longitudinal axis of at least one of said screws.

9. An implement according to claim 8, wherein said positive connection is formed by at least one screw boss that is fixed to one of said half-shells and projects into an opening in the other of said half-shells.

* * * * *